May 11, 1926.
F. HEGENBARTH
WAVE MOTOR
Filed Feb. 12, 1925
1,584,293
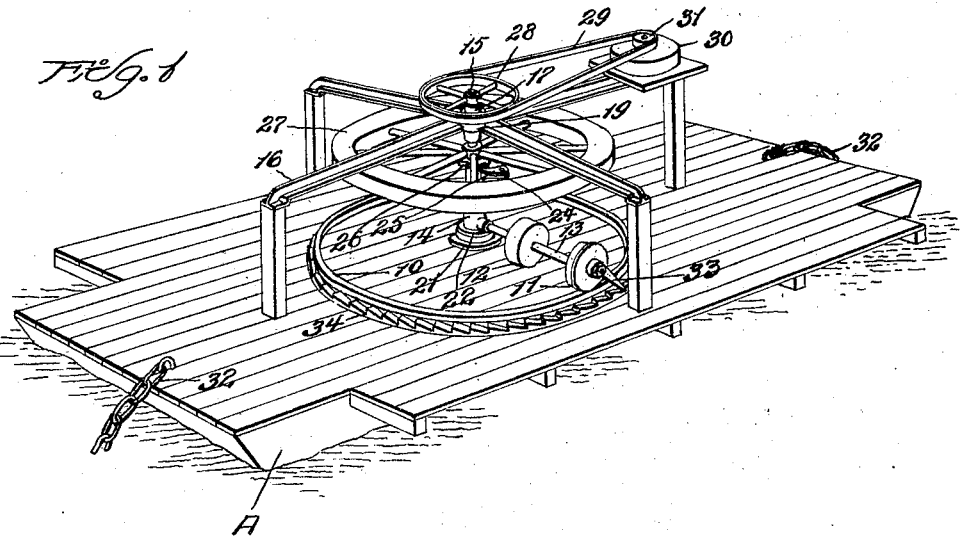
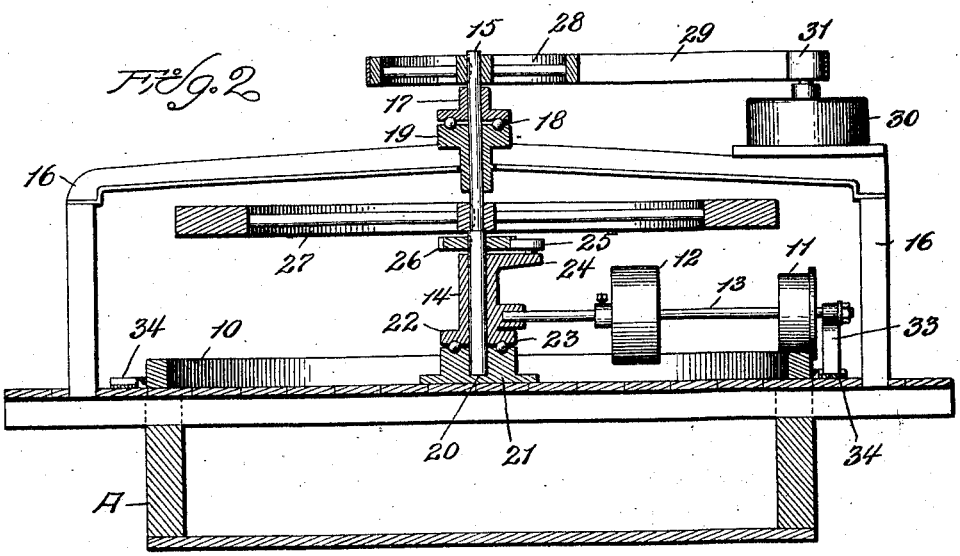
INVENTOR
Francis Hegenbarth
by James L. Hopkins, ATTORNEY.

Patented May 11, 1926.

1,584,293

UNITED STATES PATENT OFFICE.

FRANCIS HEGENBARTH, OF ST. LOUIS, MISSOURI.

WAVE MOTOR.

Application filed February 12, 1925. Serial No. 8,645.

My invention relates to improvements in wave motors, and has for its object to provide a simple mechanism that will utilize the power generated by waves, and comprising a buoyant carrier whereon an annular weight is confined within an annular path, the movement of said carrier occasioned by waves causing corresponding movement of the annular weight, and the movement of the annular weight being communicated from the weight to an objective power plant by a suitable transmission. Incidental to the organization of my invention I employ a balance wheel or its equivalent, to convert the impulses of the annular weight into relatively uniform energy.

Drawings.

In the drawings—

Fig. 1 is a perspective view of a wave motor embodying my invention.

Fig. 2 is a longitudinal vertical view of the same in mid-section.

Description.

The buoyant carrier A serves as a base for the following described mechanism, the form, size, dimensions and proportions of that carrier A being such as may best be adapted to the location of the wave motor, and best adapted to the average wave impulses to which the wave motor is to be subjected; the character of such wave impulses being largely determined by the extent of the exposure of the anchorage location to the open sea, while other factors such as seasonal winds of the locality may also require consideration.

Upon the carrier A the annular track 10 is provided, for the reception of the wheel 11 and weight 12, whose movement about the track 10 is permitted by the horizontal actuating shaft 13 which carries the wheel 11 and weight 12 and is mounted in the collar 14, that collar 14 being loosely mounted on the main or vertical driven shaft 15.

The vertical shaft 15 is carried by the spider 16, by having fixed upon itself the annular thrust-block 17, ball bearings 18 being interposed between the lower face of the thrust-block 17 and the upper face of the bearing-block 19. The lower terminal of the vertical shaft 15 rests in the cylindrical cavity 20 of the base-block 21, which base-block 21 is mounted upon the deck of the carrier A, centrally within the track 10.

The collar 14 has an annular flange 22 at its bottom, and between the lower face of said flange 22 and the upper face of the base-block 21 ball bearings 23 are interposed. At its top the collar 14 has a bracket 24 on which bracket 24 the pawl 25 is mounted, said pawl 25 cooperating with the ratchet-wheel 26 (fixed on the vertical shaft 15) to impart energy to said shaft 15 from the clock-wise movement of the horizontal shaft 13.

Above the ratchet-wheel 26 the balance-wheel 27 is fixed upon the vertical shaft 15, and at its top the vertical shaft 15 carries the drive-wheel 28 from which the belt 29 is illustrated as driving the generator 30 through the driving pulley 31.

Mode of operation.

The carrier A is moored by means of chains 32 in any suitable location, and the tilting of said carrier A will cause the clockwise displacement of the wheel 11 and shaft 13 from their initial position.

Necessarily the wave-movements will cause such movement of the shaft 13 to be intermittent, and the impulses communicated to the ratchet-wheel 26 will correspondingly be intermittent; but the balance-wheel 27 will serve by its momentum to secure regular rotation of the shaft 15.

The anchorage of the carrier A by the chains 32 will tend to limit the pitch-and-toss movement of the carrier A while leaving the rolling movement of said carrier A practically unlimited, and as a precaution against excessive rolling movement of the carrier A I have provided the weight 12 with set-screw 35 whereby said weight 12 may be set in fixed positions on the horizontal shaft 13 toward and from the vertical shaft 15, being fixed closer to the shaft 15 to prevent excessive movement of the horizontal shaft 13.

I prevent anti-clockwise movement of the shaft 13 by providing the pawl 33 on the outer terminal of said shaft 13, said pawl 33 engaging with the ratchet-annulus 34.

It will be understood that I have described merely the preferred embodiment of my invention as required by statute, and that various changes of structure may be made therein without departing from my invention as defined in the appended claims.

While the foregoing description and the drawings illustrate and describe a buoyant carrier specially constructed for the purposes of my invention, I do not desire to be limited to such specially constructed carrier, as my invention is capable of use upon any carrier subjected to wave motion in the regular course of its operation, such as in passenger or freight ship or steamship, or barge or other vessel towed thereby.

Claims.

1. A wave-motor comprising a buoyant carrier; a vertical driven shaft; a horizontal actuating shaft having ratchet-and-pawl connection with said driven shaft; and a wheel carried by said actuating shaft.

2. A wave-motor comprising a buoyant carrier; a vertical driven shaft; a horizontal actuating shaft having ratchet-and-pawl connection with said driven shaft; a wheel carried by said actuating shaft and a weight adjustably mounted upon said actuating shaft.

3. A wave-motor comprising a buoyant carrier; a spider mounted on said carrier; a vertical driven shaft suspended from said carrier; a horizontal actuating shaft having ratchet-and-pawl connection with said driven shaft; and a wheel carried by said actuating shaft.

4. A wave-motor comprising a buoyant carrier; a spider mounted on said carrier; a vertical driven shaft suspended from said carrier; a horizontal actuating shaft having ratchet-and-pawl connection with said driven shaft; a wheel carried by said actuating shaft, and a weight adjustably mounted upon said actuating shaft.

5. A wave-motor comprising a buoyant carrier; a vertical driven shaft mounted on said carrier; a drive-wheel and a balance-wheel mounted on said driven-shaft; a horizontal driving shaft having ratchet-and-pawl connection with said driven shaft; a wheel mounted on said driving shaft, and means for permitting the movement of said driving shaft in but one direction.

6. In a wave motor, a driving shaft; a driven shaft rotated by said driving shaft; a balance-wheel mounted on said driven shaft; and a weight adjustably mounted on said driving shaft.

7. In a wave motor a buoyant carrier; a driven shaft vertically mounted on said carrier; and a driving shaft radially mounted on said driven shaft and having ratchet-and-pawl engagement with said driven shaft.

8. A wave motor comprising a buoyant carrier; a driven shaft mounted on said carrier; an annular track concentrically mounted about said driven shaft; a wheel arranged to travel in one direction only upon said track; a collar loosely mounted on said driven shaft; a driving shaft mounted in said collar and carrying said wheel; and a ratchet-and-pawl connection between said collar and said driven shaft.

In testimony whereof I have hereunto affixed my signature.

FRANCIS HEGENBARTH.